Sept. 29, 1942. J. D. MOONEY 2,297,011
APPARATUS FOR ILLUSTRATING ECONOMIC PRINCIPLES
Filed April 19, 1941 6 Sheets-Sheet 1
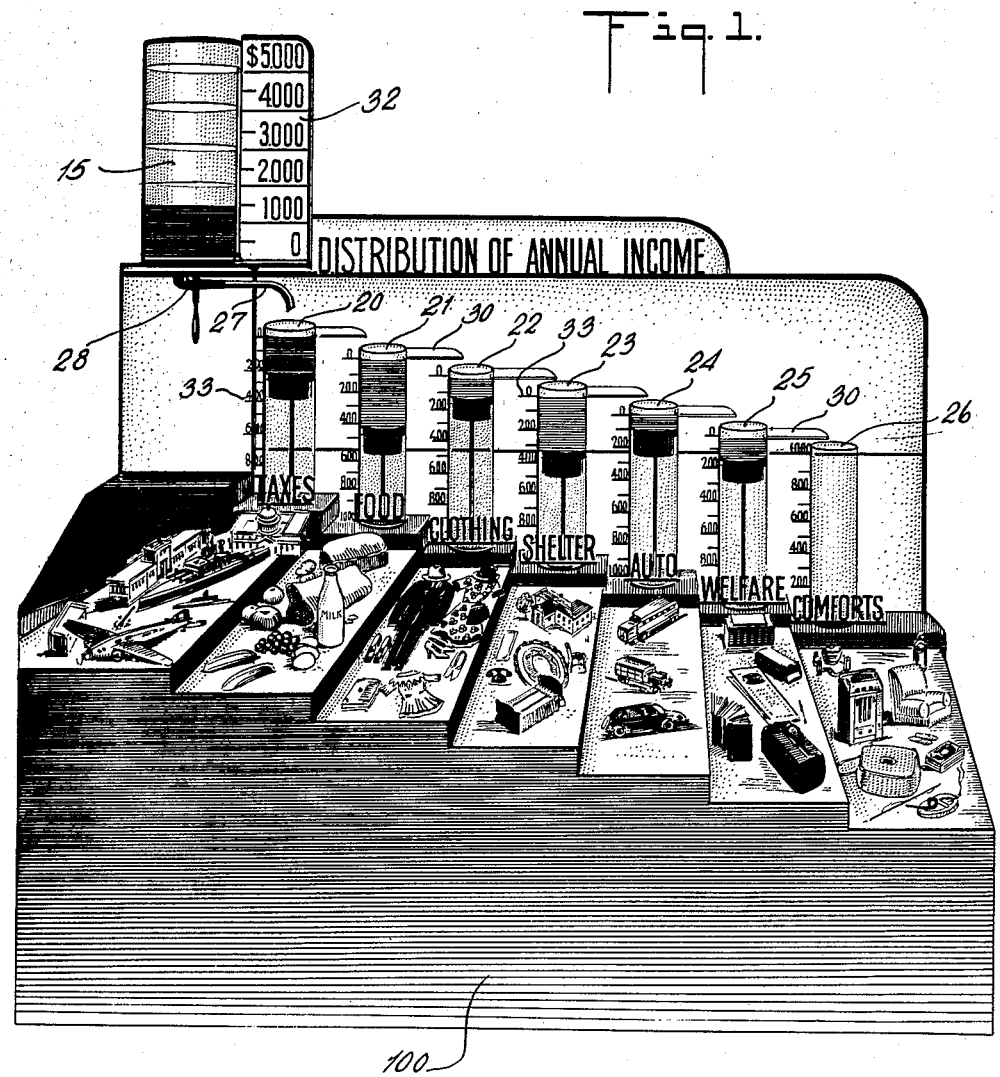
INVENTOR
JAMES D. MOONEY
BY
ATTORNEY

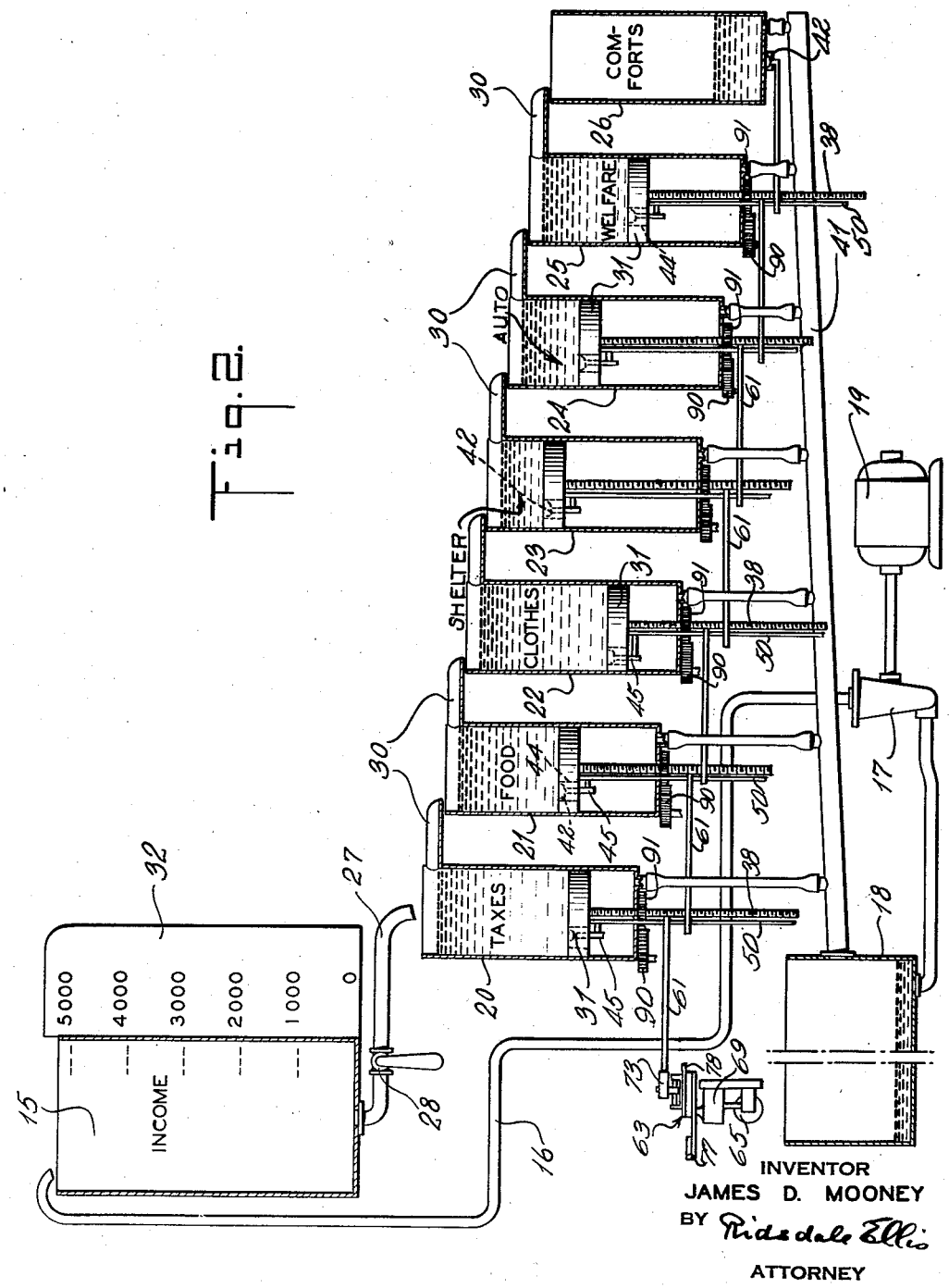

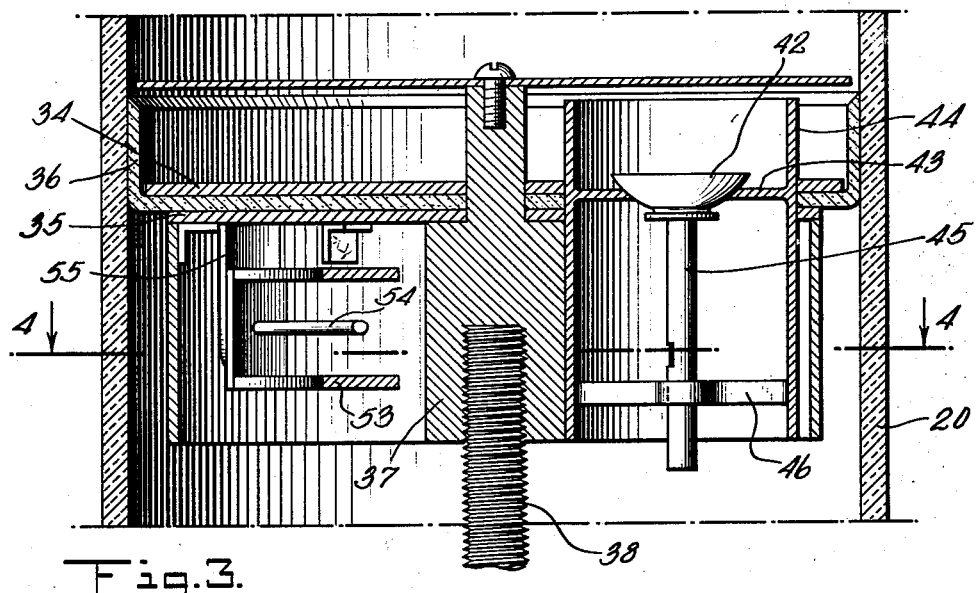
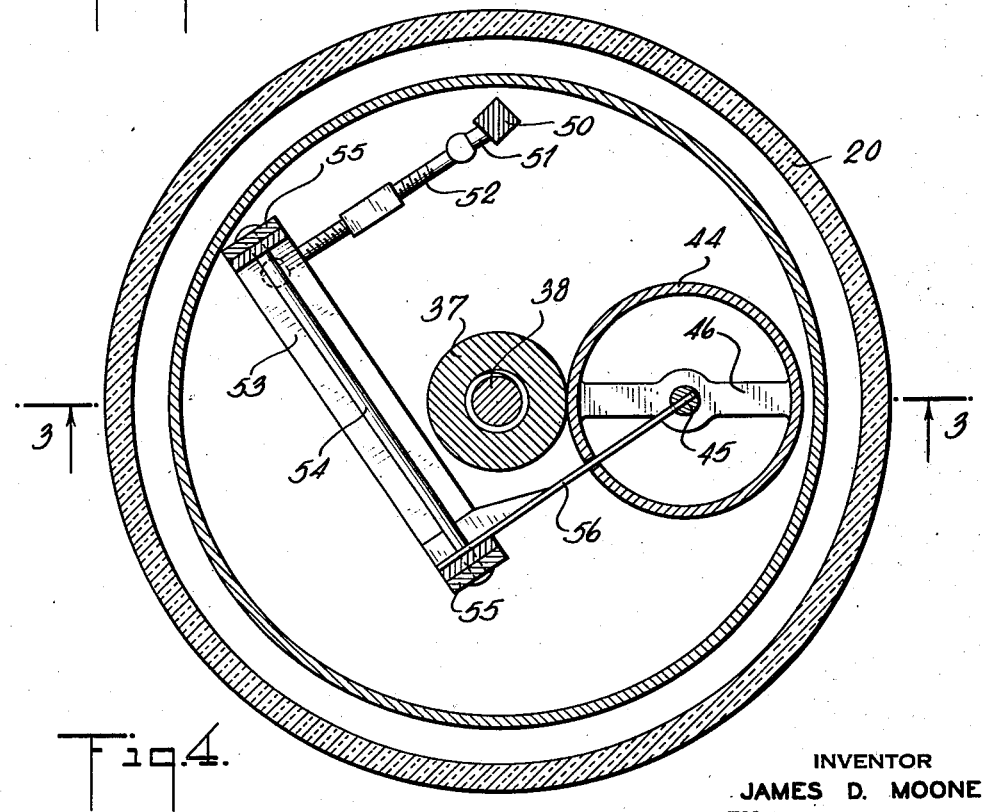

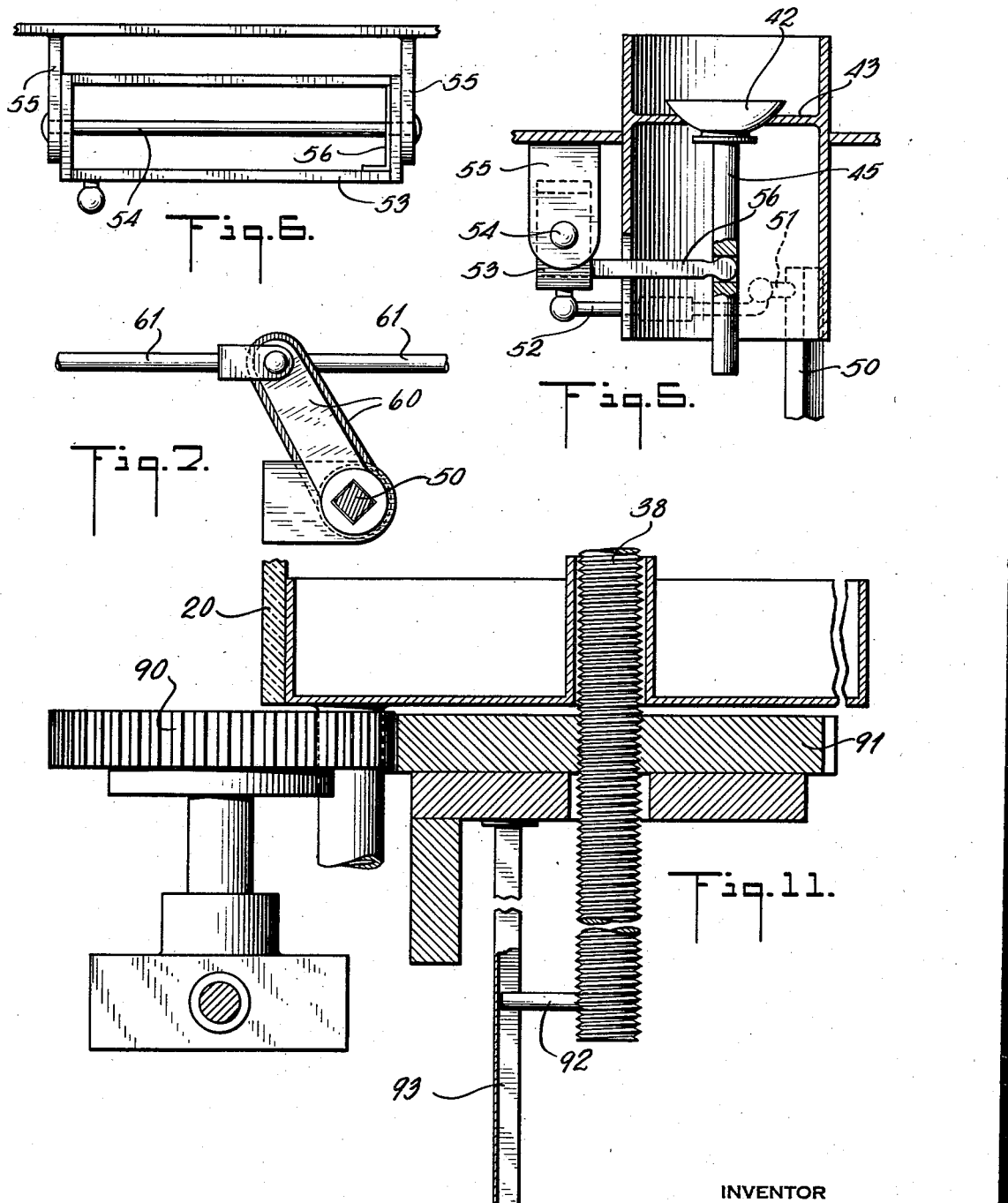

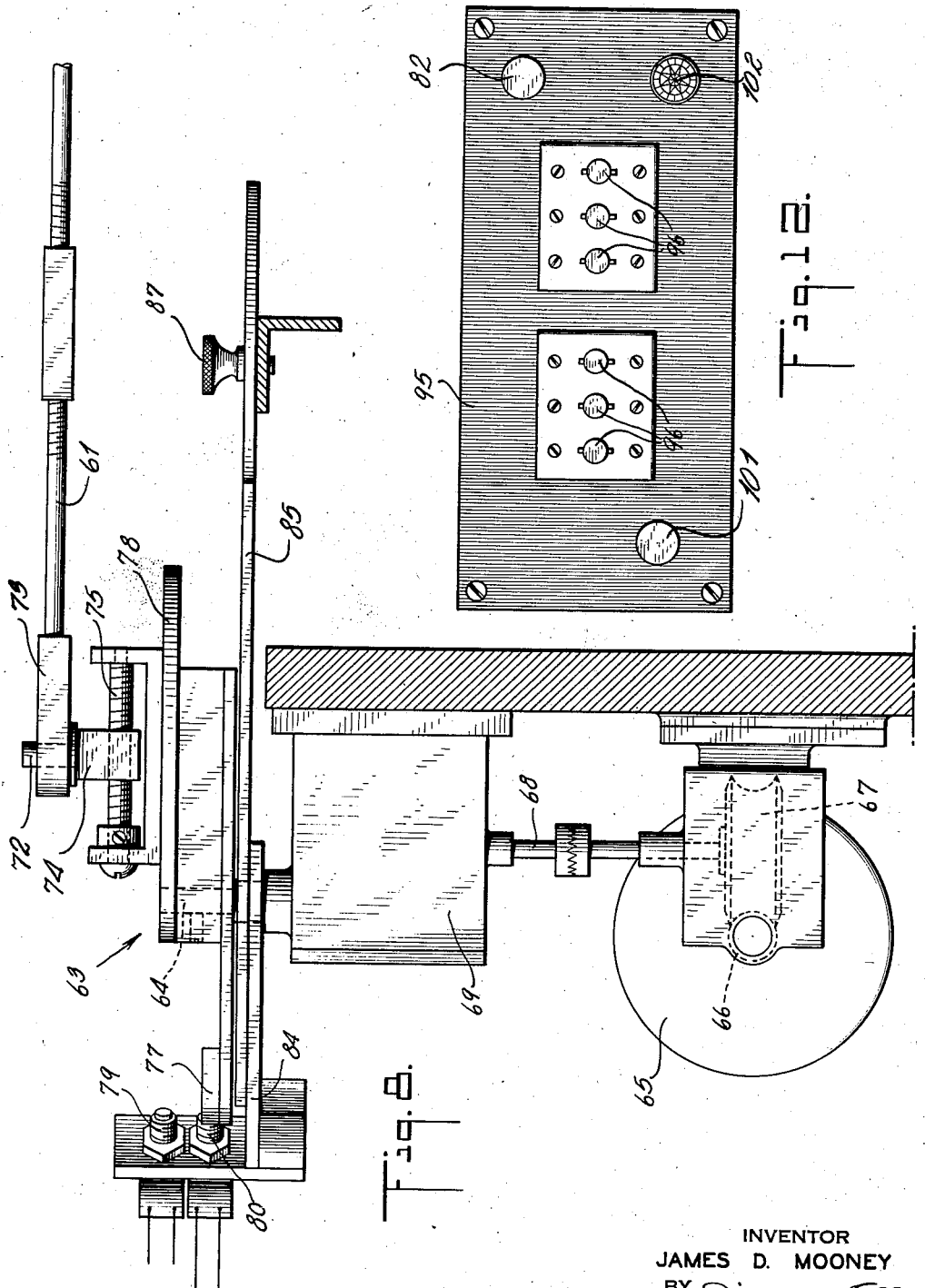

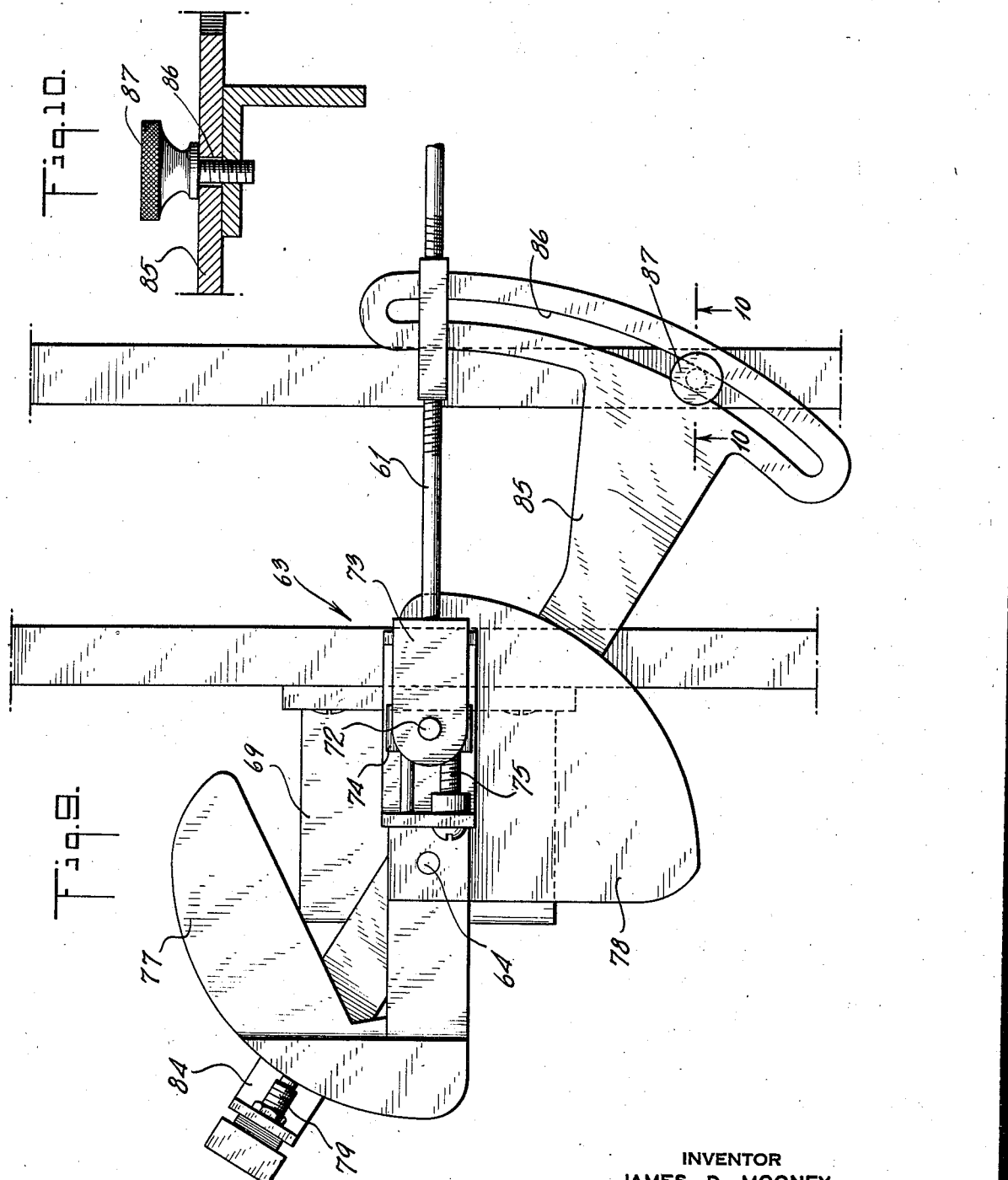

Patented Sept. 29, 1942

2,297,011

UNITED STATES PATENT OFFICE 2,297,011

APPARATUS FOR ILLUSTRATING ECONOMIC PRINCIPLES

James D. Mooney, Oyster Bay, N. Y.

Application April 19, 1941, Serial No. 389,319

9 Claims. (Cl. 35—24)

This invention relates to apparatus for illustrating economics by physical analogies, especially with reference to the distribution of income between series of classified expenditures. Much of the current economic discussions revolve about the "purchasing capacity" of the average man. While purchasing capacity may be expressed as the relation between a man's annual income and what he has to pay for the things he needs or desires, the term has little concrete meaning.

It is not easy for the average person to visualize what happens when various items of the family budget are increased or decreased. He may have read that if taxes go up he will have to reduce his expenses in some other direction, but his ideas on the subject are pretty hazy.

The object of the present invention is to provide a three-dimensional graphic scheme whereby the budgeting, conscious or unconscious, of a family may be illustrated and taught concretely so that the mind obtains a physical picture to aid what have hitherto been largely, if not entirely, abstract conceptions.

According to the present invention, the distribution of family income is illustrated by means of a transparent graduated tank containing liquid to a height corresponding to the income of the family. This liquid is then discharged into a series of transparent graduated receptacles, arranged to overflow from one to the other down the series. These receptacles are labelled "Taxes," "Food," "Shelter," etc., down to "Comforts." They are arranged in order of necessity, with taxes placed first. After taxes have been paid and food, shelter and the other total expenditures have been taken care of, the surplus, if any, goes to comforts. This process can be represented hydraulically by providing means for varying the volume of each receptacle available for the receipt of liquid to control the proportion of liquid received by each receptacle to correspond with the proportion of family income spent for taxes, food, shelter, and so forth.

Such apparatus may be used to show that the $800-a-year man, however he may divide his expenditures, is able to buy only the bare necessities of life. He has nothing left for incidentals or security, let alone comforts and small luxuries. In the case of the $1,200-a-year man, only a small amount is left for incidentals, with no margin for security and the comforts of life. The $1,800-a-year man manages to have a little left for these things. Not until we come to the $5,000-a-year man, however, do we find enough purchasing capacity to procure security and the things that make for comfort and a reasonably high standard of living.

The apparatus is also applicable to illustrate the manner in which national income can be divided into various items of expenditure such as defense, social security, public works, etc.

A suitable embodiment of the invention is shown, by way of example, in the accompanying drawings, in which:

Fig. 1 is a perspective view of the apparatus as a whole;

Fig. 2 is a diagrammatic elevation of the purely hydraulic parts of the apparatus;

Fig. 3 is a vertical section through one of the pistons on the line 3—3 of Fig. 4;

Fig. 4 is a horizontal section through one of the pistons on the line 4—4 of Fig. 3;

Fig. 5 is a detail view of the valve in one of the pistons and its operating mechanism;

Fig. 6 is a view of the rocker by means of which the valve of Fig. 5 is opened and closed;

Fig. 7 is a plan view of the crank and connecting rod by which the rod which opens and closes the valve of Fig. 5 is turned;

Fig. 8 is a side elevation of the mechanism for moving the connecting rod of Fig. 7 to and fro;

Fig. 9 is a plan view of the mechanism shown in Fig. 8;

Fig. 10 is a section on the line 10—10 of Fig. 9;

Fig. 11 is a vertical section through the lower part of one of the cylinders; and Fig. 12 is an elevation of the instrument panel.

The apparatus comprises an "income" tank 15 arranged to be supplied with a predetermined amount of a suitable fluid, such as colored water, by a pipe 16 and pump 17 from a reservoir 18. A motor 19 drives the pump.

At a lower level than the tank 15 are a series of cylinders 20, 21, 22, 23, 24, 25, and 26. A pipe 27 equipped with a valve 28 is provided for discharging the fluid from the tank 15 into the first cylinder 20. Each of these cylinders except the last has an overflow spout 30 arranged so that when it is full the excess liquid will overflow into the next cylinder in the line. These cylinders are labelled "Taxes," "Food," "Clothes," "Shelter," "Auto," "Welfare," and "Comforts." The labels are arranged in order of necessity. We all have to pay taxes so the apparatus is arranged so that the liquid from the "Income" tanks fills the "Taxes" cylinder first. Then since everybody has to eat, the next cylinder is marked "Food." When taxes have been paid and food has been bought, the next items to consider are clothes and shelter. If there is any income left after these essentials have been taken care of, it goes to the family automobile welfare and comforts.

The amount spent on different items will vary with variations in the total income. Also for any given income the proportions spent on the various items will vary with personal tastes and idiosyncrasies. Hence, means are provided for changing the volume of each cylinder available for the receipt of liquid to control the proportion of liquid received by each cylinder to correspond with the proportion of family income spent for taxes, food, shelter, and so forth. One convenient way of changing the effective volume of the cylinders is to provide each cylinder except the last one with a vertically adjustable piston 31.

To enable specific situations to be demonstrated, scales representing dollars of annual income and expenditures are provided. Alongside the tank 15 is a scale 32 and a series of scales 33 are provided at the side of each cylinder. The scale on the "Income" tank 15 reads from the bottom upwardly because it is drained to fill the expenditure cylinders, just as a year's income is wholly spent on one or other of the items, taxes, food, and so forth. The scales on cylinders 20 to 25 read from the top down since the amount of liquid they contain varies with the height of the piston, the top of the liquid being fixed by the position of the overflow spout. Since any income left after filling cylinders 20 to 25 goes to "Comforts," cylinder 26 has no movable piston and is provided with a scale which reads from the bottom upwardly.

The apparatus shown in Fig. 1 is adjusted to illustrate the division of an income of $1450 as follows:

| | |
|---|---:|
| Taxes | $250 |
| Food | 450 |
| Clothing | 100 |
| Shelter | 350 |
| Auto | 100 |
| Welfare | 150 |
| Comforts | 50 |
| | $1450 |

Various adjustments of expenditure can be readily made by changing the position of the pistons. For example, by moving out into the country taxes may be reduced at the expense of an increase in transportation (Auto) costs. That change could be demonstrated by moving the piston in the "Taxes" cylinder upwardly until its top is opposite $150 on the scale and dropping the "Auto" piston to the $200 mark.

The piston construction is shown in detail in Figs. 3 and 4. Each piston comprises two discs 34 and 35 clamping between them a cup leather 36. These discs are mounted on a central boss 37 from which depends a threaded piston rod 38.

At the end of each operation of the apparatus each cylinder has to be emptied and the liquid returned to the reservoir 18. While that might be done by opening a discharge valve at the bottom of the last cylinder and then moving all the pistons to the top of their cylinders to cause all the liquid therein to flow down into the "Comfort" cylinder, a more advantageous method is to drain off each cylinder individually into a common header 41, as indicated diagrammatically in Fig. 2. This method involves inserting drain valves in each piston. As shown, these valves consist of a rubber cup 42 arranged to seat on the margin of a hole in a partition 43 in a short tube 44 extending through the discs 34 and 35. The valve stem 45 is slidably mounted in a cross-bar 46.

As the valves have to be opened and closed in any position of the piston, a valve-operating rod 50 is provided depending from the underside of the piston but mounted so that it can turn about its axis. This rod has a short crank arm 51 at its upper end (Figs. 4 and 5) connected by a ball and socket joint to a link 52. The other end of this link is connected to a frame 53 pivotally mounted on a pin 54 extending between two brackets 55 secured to the underside of the disc 35. This frame carries a laterally extending arm 56, the end of which engages a slot in the valve stem. By this mechanism any turning movement of the rod 50 is translated into vertical movement of the valve stem and valve.

For turning the rods 50 a series of crank arms 60 (Fig. 7) are mounted below the cylinders. These arms are connected together by a series of rods 61 so that all the crank arms can be moved in unison. These crank arms are provided with square holes to engage the square section valve operating rods 50 slidably but non-rotatably. As the pistons are raised or lowered, the rods 50 slide up or down in the holes in these crank arms. If the rods 61 are moved in one direction, all the valves 42 are lifted off their seats and vice versa.

The mechanism for moving the rods 61 longitudinally to and fro is shown in Figs. 8, 9, and 10. It consists essentially of a crank connected to the rods 61 and provided with means for turning it substantially 180° and then stopping it. Each half revolution alternately opens and closes the valves.

The crank, designated as a whole by 63, is mounted on a shaft 64 driven by a motor 65 through worm 66, worm wheel 67, shaft 68 and speed reduction gear 69. As shown, the crank is of the variable-throw type to aid in the adjustment of the valve operating mechanism. The variation in throw is accomplished by mounting the pin 72 which passes through the connecting rod head 73, on a block 74 mounted on a threaded spindle 75. This spindle is radially mounted on the crank so that by turning it the block 74 and pin 72 can be moved in or out radially.

The crank 63 is provided with two cams 77 and 78 arranged to contact and open switches 79 and 80. These switches are arranged in series in the motor circuit so that, so long as neither cam is in contact with its corresponding switch, the motor 65 operates. As soon as either switch is contacted the motor circuit is broken and the motor stops. To enable the motor to be started under these conditions, a push-button switch 82 (Fig. 12) is provided for closing a shunt around the switches 79 and 80. In operating the apparatus, the push-button is pressed down long enough to permit the cam which is in contact with its switch to move out of contact. It can then be released and the motor will continue to operate until the other cam contacts the other switch and breaks the motor circuit.

To enable the time of motor cut-off to be adjusted, the switches 79 and 80 are secured to a bracket 84 mounted to turn about the shaft 64. To this bracket is attached an arm 85 provided with a quadrantal slot 86 for cooperation with a clamping screw 87 by which the arm may be locked in the desired adjusted position.

While the piston valves can be and are operated simultaneously, the pistons themselves must be capable of being raised or lowered independently of each other. For that reason each piston has is own motor (not shown) driving a gear 90 in mesh with a gear 91 through which the piston rod 38 passes in threaded engagement therewith. Rotation of the piston rod 38 is prevented in any suitable way, such as by providing it with a laterally projecting pin 92 which slides up and down in a channel bar 93 to one side of the piston rod. As the piston rod cannot turn, rotation of the gear-nut 91 raises or lowers the piston rod and piston.

The instrument panel 95 is provided with six double-throw switches 96, one for each piston motor. When a switch is thrown in one direction the motor rotates in the direction necessary to raise the piston. When the switch is thrown in the other direction, the piston motor is rotated in the opposite direction to lower the piston.

The instrument panel also carries a push-button switch 101 for operating the motor 19 by which the "Income" tank 15 is filled to the desired height. A signal light 102 is provided to indicate that the apparatus is connected to the source of supply of electricity.

The operating mechanism, motors, pumps, switches, and so forth, are housed in a cabinet 100 to conceal the operating elements so that there are a minimum of mechanical parts to take the attention of observers away from the vital features to be demonstrated. If there are too many mechanical adjuncts visible, the observer's mind is apt to wander from a consideration of the hydraulic features and what they represent to a study of the mechanical gadgets to see how they work.

The top of the cabinet serves as a support for models of articles illustrative of the different items of expenditure. For example, to illustrate what taxes are paid for, models of a state house, battleship and aeroplane are placed in front of the "Taxes" cylinder.

It will be noted that the various cylinders are arranged step-wise to permit liquid to overflow from one to the other. The same step arrangement is followed out in the top of the cabinet so that the eye readily connects the cylinder, its label "Taxes," etc., and the models of articles for which taxes have to be paid arranged in front of that particular cylinder. In this way a three-dimensional graphic representation is obtained of the way in which the annual income is distributed. The more labels can be supplemented by models, the less imagination is required to visualize what is being demonstrated.

I claim:

1. A device for illustrating the distribution of income between a series of classified expenditures, comprising a transparent graduated tank for containing liquid to a height corresponding to the income of a person as indicated by the graduations thereon, a series of transparent graduated receptacles, means for transferring the liquid in the tank to the first receptacle in the series, overflow spouts for transferring excess liquid from each receptacle to the next in the series, and means for varying the volume of each receptacle below said spouts available for the storage of liquid to control and indicate by the graduations on said receptacle the proportion of liquid retained thereby to simulate variations in the division of income into various classifications of expenditure with changes in income and in the amount of individual items of expense.

2. A device for illustrating the distribution of income between a series of classified expenditures, comprising a transparent graduated tank for containing liquid to a height corresponding to the income of a person as indicated by the graduations thereon, a series of transparent graduated cylinders, means for transferring the liquid in the tank to the first receptacle in the series, an overflow spout on each cylinder except the last for transferring excess liquid from each cylinder to the next in the series, and a vertically movable piston in each cylinder except the last to control and indicate by the graduations on said cylinder the proportion of liquid retained thereby to simulate the division of income into various classifications of expenditure.

3. A device for illustrating the distribution of income between a series of classified expenditures, comprising a cabinet, a transparent tank mounted on said cabinet for containing liquid to a height corresponding to the income of a person, a series of transparent receptacles arranged in a row on the top of said cabinet, means for transferring the liquid in the tank to the first receptacle in the series, means for transferring excess liquid from each receptacle to the next in the series to simulate the division of income into various classifications of expenditure, the top of said cabinet having a series of forwardly extending sections in register with the series of receptacles on the rear part of the top, and an article on each section illustrative of the classification of expenditure represented by the corresponding receptacle.

4. A device for illustrating the distribution of income between a series of classified expenditures, comprising a cabinet, a transparent graduated tank mounted on said cabinet for containing liquid to a height corresponding to the income of a person, a series of transparent graduated receptacles arranged in a row on the top of said cabinet, means for transferring the liquid in the tank to the first receptacle in the series, means for transferring excess liquid from each receptacle to the next in the series, means for varying the volume of each receptacle available for the storage of liquid to control the proportion of liquid retained by each receptacle to simulate variations in the division of income into various classifications of expenditure with changes in income and the amount of individual expense, the top of said cabinet having a series of forwardly extending sections in register with the series of receptacles on the rear part of the top and an article on each section illustrative of the classification of expenditure represented by the corresponding receptacle.

5. A device for illustrating the distribution of income between a series of classified expenditures, comprising a transparent graduated cylinder open at the top for receiving liquid to represent money expended, an overflow spout at one side of the cylinder for discharging excess liquid, a piston in the cylinder, a threaded piston rod extending downwardly from the piston, a nut rotatably mounted on said rod, means for rotating said nut to raise and lower said rod to vary the distance between the top of the piston and the overflow spout, a valve in the piston for discharging liquid above the piston, a valve-operating shaft parallel to the piston rod and means for turning said shaft to open and close said valve in any position of the piston.

6. A device for illustrating the distribution of income between a series of classified expenditures, comprising a transparent cylinder open at the top for receiving liquid to represent money expended, an overflow spout at one side of the cylinder for discharging excess liquid, a piston in the cylinder, a rod extending downwardly from the piston, means for raising and lowering the piston rod to vary the distance between the top of the piston and the overflow spout, a valve in the piston for discharging liquid above the piston, a valve-operating shaft parallel to the piston rod and means for turning said shaft to open and close said valve in any position of the piston.

7. In a hydraulic device for illustrating economic principles, a transparent receptacle, an overflow spout therefor, and means for varying the depth of said receptacle below said spout available for the storage of the liquid used to represent values.

8. In a hydraulic device for illustrating economic principles, a transparent receptacle, an overflow spout therefor, means for varying the depth of said receptacle below said spout available for the storage of the liquid used to represent values, and graduations on said receptacle leading from the spout downwardly.

9. A device for illustrating the distribution of income between a series of classified expenditures, comprising a transparent tank for containing liquid to a height corresponding to the income of a person, a series of transparent receptacles, means for transferring the liquid in the tank to the first receptacle in the series, overflow spouts for transferring excess liquid from each receptacle to the next in the series, and means for varying the volume of each receptacle available for the storage of liquid below said spouts to control the proportion of liquid retained thereby to simulate variations in the division of income into various classifications of expenditure with changes in income and in the amount of individual items of expense.

JAMES D. MOONEY.